United States Patent
McCoy

(10) Patent No.: US 9,145,731 B1
(45) Date of Patent: Sep. 29, 2015

(54) WINDOW INSERTABLE PET DOOR

(71) Applicant: Kim McCoy, West Haven, CT (US)

(72) Inventor: Kim McCoy, West Haven, CT (US)

( * ) Notice: Subject to any disclaimer, the term of this patent is extended or adjusted under 35 U.S.C. 154(b) by 0 days.

(21) Appl. No.: 14/285,198

(22) Filed: May 22, 2014

(51) Int. Cl.
*A01K 1/035* (2006.01)
*E06B 7/32* (2006.01)
*A01K 29/00* (2006.01)
*E06B 7/16* (2006.01)

(52) U.S. Cl.
CPC . *E06B 7/32* (2013.01); *A01K 29/00* (2013.01); *E06B 7/16* (2013.01)

(58) Field of Classification Search
CPC ..... A01K 1/035; A01K 1/033; A01K 1/0017; E06B 7/32; E06B 7/00
USPC .......... 119/484, 485, 501, 524, 622; 160/116, 160/180
See application file for complete search history.

(56) References Cited

U.S. PATENT DOCUMENTS

| | | | | |
|---|---|---|---|---|
| 2,832,406 | A * | 4/1958 | Turenne | 160/179 |
| 3,985,174 | A | 10/1976 | Bricker | |
| 4,022,263 | A * | 5/1977 | Beckett et al. | 160/92 |
| 4,029,048 | A * | 6/1977 | Gershbein | 119/165 |
| 4,047,331 | A * | 9/1977 | Davlantes | 49/171 |
| 4,334,573 | A | 6/1982 | Hackman et al. | |
| 4,603,724 | A | 8/1986 | Borwick | |
| 4,754,797 | A * | 7/1988 | Sronce | 160/354 |
| 4,938,169 | A * | 7/1990 | Barmakian | 119/622 |
| 5,117,890 | A * | 6/1992 | Taylor et al. | 160/180 |
| 5,522,344 | A * | 6/1996 | Demurjian | 119/474 |
| 5,535,804 | A * | 7/1996 | Guest | 160/180 |
| 5,651,331 | A * | 7/1997 | Cleri, Jr. | 119/484 |
| 5,890,455 | A * | 4/1999 | Donchey | 119/484 |
| 7,614,363 | B2 * | 11/2009 | Di Angelo et al. | 119/28.5 |
| 8,434,264 | B2 * | 5/2013 | Bosserdet, Jr. | 49/169 |
| 8,484,896 | B1 * | 7/2013 | Skubiak, Jr. | 49/169 |
| 8,495,835 | B2 * | 7/2013 | Timmons | 49/171 |

* cited by examiner

*Primary Examiner* — Trinh Nguyen
(74) *Attorney, Agent, or Firm* — Crossley Patent Law

(57) ABSTRACT

A window insertable pet door devised for removable installation in a window without tools and without altering the window by including a center frame having a U-shaped bracket on a top side thereof and a pair of side panels that slidingly extend from the center frame to engage a bottom railing and a respective one of a right railing and a left railing of a window frame. Each side panel includes an outer trim and a static barrier wall therewithin formed of a plurality of vertical popoid pleats. An annular door frame is centrally disposed in the center frame, with a gasket being disposed between the door frame and the center frame. A plurality of pliable triangular flaps, radially disposed within the door frame, converge at a center point of the door frame to simultaneously fold inwardly and outwardly for passage of a cat therethrough.

14 Claims, 3 Drawing Sheets

WINDOW INSERTABLE PET DOOR

BACKGROUND OF THE INVENTION

Various types of pet doors that permit a pet to enter and exit through exterior doors and windows are known in the prior art; however, a majority of these pet doors require the use of tools for installation and the alteration of the door or window into which the pet door is installed. Further, many of the known pet doors require installation near the bottom end of the door, making the pet door accessible to wild animals, rather than to only the pet or pets of a household. What is needed is a window insertable pet door for removable installation in a window without tools and without altering the window and for eliminating accessibility to wild animals. The present device accomplishes the foreoing by including a substantially planar center frame having a U-shaped bracket installed on a top side which receives a lower wall of a slider window therein thereof to assist in securing the center frame to a window. A side panel slidingly extends from each side of the center frame and is configured to removably slidingly engage a bottom railing and a respective one of a right railing and a left railing of a window frame surrounding the window. Each side panel has a continuous outer trim and a static barrier wall continuously disposed within the outer trim and being formed of a plurality of vertical popoid pleats. An annular door frame, centrally disposed through the center frame, has an inner perimeter and an outer perimeter and a plurality of triangular flaps radially disposed therein from a center point. The flaps simultaneously fold inwardly in a direction toward the rear side of the center frame from a neutral position in a same plane as the inner perimeter and alternately simultaneously fold outwardly in a direction toward the front side of the center frame from the neutral position. The door frame has a diameter configured to allow passage of the domestic cat therethrough. A gasket is continuously disposed between the outer perimeter of the door frame and the center frame. The gasket is formed of a mesh screen that permits airflow through the gasket and alternately a solid wall, such as Plexiglass® or glass. The gasket, the flaps, and the side panels prevent wild animals and insects from entering a structure through the device, in contrast to a conventional swinging pet door installed at the bottom of a door.

Thus, the present device is installable into a window with proper support, but without the use of tools and without altering a window or a door as is required by many pet doors. The present device provides a pet caretaker the freedom to be away from home without the worry of whether the pet has access to the outdoors or to the indoors for food, water, and shelter. Use of the present device allows a caretaker to leave a litter box outdoors which, in turn, eliminates odors associated with a litter box from the structure.

FIELD OF THE INVENTION

The present invention relates to pet doors, and more particularly, to a window insertable pet door devised for removable installation in a window without tools and without altering the window.

SUMMARY OF THE INVENTION

The general purpose of the present window insertable pet door, described subsequently in greater detail, is to provide a window insertable pet door which has many novel features that result in a window insertable pet door which is not anticipated, rendered obvious, suggested, or even implied by prior art, either alone or in combination thereof.

To accomplish this, the present window insertable pet door is installed without tools and allows a domestic cat to independently enter and exit a structure through a window, which remains unaltered. The window insertable pet door includes a substantially planar center frame having a U-shaped bracket installed on a top side thereof, which is provided to assist in securing the center frame to a window. A pair of adjustable side panels slidingly extends from the center frame. Each side panel has a continuous outer trim and a static barrier wall continuously disposed within the outer trim and formed of a plurality of vertical popoid pleats.

An annular door frame, centrally disposed through the center frame, has an inner perimeter and an outer perimeter and a plurality of triangular flaps is radially disposed therein. Each flap has an outer edge attached to the inner perimeter and an inner edge centrally disposed with respect to the inner perimeter with the inner edges converging at a center point of the door frame. The flaps are configured to simultaneously fold inwardly in a direction toward the rear side of the center frame from a neutral position in a same plane as the inner perimeter and alternately simultaneously fold outwardly in a direction toward the front side of the center frame from the neutral position. Each flap is formed of a transparent pliable material. The door frame has a diameter configured to allow passage of the domestic cat therethrough. A gasket is continuously disposed between the outer perimeter of the door frame and the center frame. The gasket is formed of a mesh screen that permits airflow through the gasket and alternately a solid wall, such as Plexiglass® or glass. The gasket, the flaps, and the side panels prevent wild animals and insects from entering a structure through the device, in contrast to a conventional swinging pet door installed at the bottom end of a door.

The bracket disposed on the center frame is configured to removably receive a lower wall of a slider window, which slides either vertically or horizontally, disposed within a window frame upon placement of the window in a raised and alternately in a partially raised position. Each of the side panels is configured to removably slidingly engage a bottom railing and a respective one of a right railing and a left railing of the window frame. Thus, the present device is installable into a window with proper support, but without the use of tools and without altering a window or a door as is required by many pet doors. The present device provides a pet caretaker the freedom to be away from home without the worry of whether the pet has access to the outdoors or to the indoors for food, water, and shelter. Use of the present device allows a caretaker to leave a litter box outdoors which, in turn, eliminates odors associated with a litter box from the structure. Thus has been broadly outlined the more important features of the present window insertable pet door so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
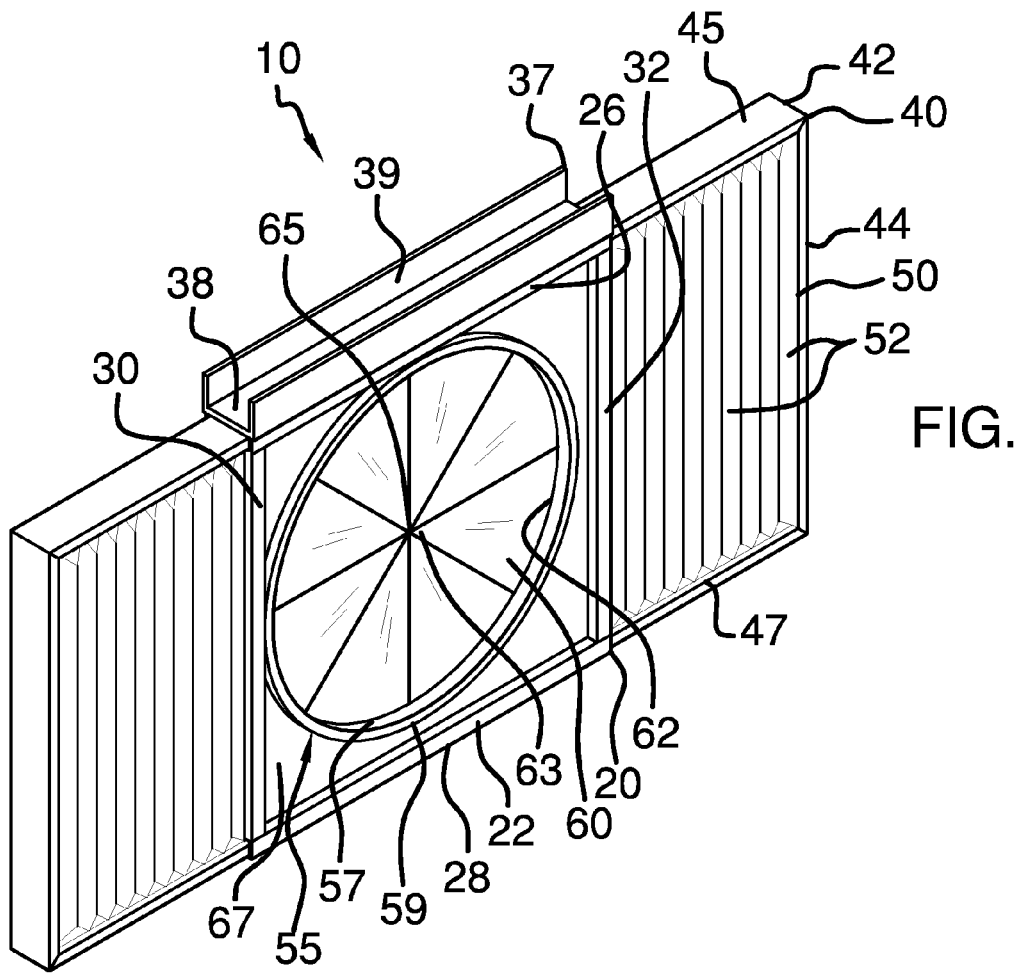
FIG. 1 is an isometric view.
Figure 2:
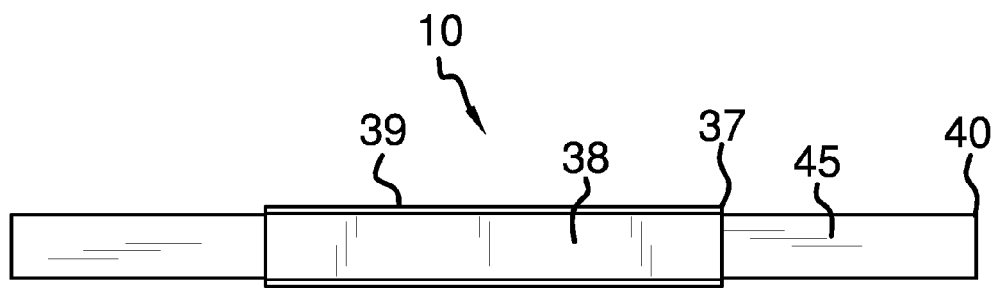
FIG. 2 is a top plan view.

With reference now to the drawings, and in particular FIGS. 1 through 5 thereof, an example of the instant window insertable pet door employing the principles and concepts of the present window insertable pet door and generally designated by the reference number 10 will be described.

Referring to FIGS. 1 through 5 the present window insertable pet door 10 devised for removable installation in a window without tools and without altering the window is illustrated. The device 10 allows a domestic cat to independently enter and exit a structure through the window. The window insertable pet door 10 includes a substantially planar center frame 20 having a front side 22, a rear side 24, a top side 26, a bottom side 28, an open left side 30, and an open right side 32. A chamber 35 is continuously disposed between the front and rear sides 22, 24, the top and bottom sides 26, 28, and the left and right sides 30, 32. A U-shaped bracket 37 is provided to assist in securing the center frame 20 to a window. The bracket 37 has a central bottom end 38 continuously disposed only on the center frame 20 top side 26 and a pair of side walls 39 extending vertically from the central bottom end 28.

A pair of adjustable side panels 40 is slidingly extendible from the chamber 35. One of the side panels 40 extends away from each of left side 30 and the right side 32 of the center frame 20. An outer trim 42 is continuously disposed on each of the side panels 40. The outer trim 42 has at least one outer end 44 parallel to the respective left and right sides 30, 32 of the center frame 20, a top end 45, and a bottom end 47. Each of the top end 45 and the bottom end 47 is perpendicular to the outer end 44. A static barrier wall 50 is continuously disposed between the outer end 44, the top end 45, and the bottom end 47 of the outer trim 42 of each of the side panels 40. Each barrier wall 50 is formed of a plurality of vertical popoid pleats 52.

An annular door frame 55 is centrally disposed through the center frame 20. The door frame 55 has an inner perimeter 57 and an outer perimeter 59. A plurality of triangular flaps 60 is radially disposed within the door frame 55. Each flap 60 has an outer edge 62 attached to the inner perimeter 57 and an inner edge 63 centrally disposed with respect to the inner perimeter 57. The inner edges 63 of the flaps 60 converge at a center point 65 of the door frame 55. The flaps 60 are configured to simultaneously fold inwardly in a direction toward the rear side 24 of the center frame 20 from a neutral position in a same plane as the inner perimeter 57 and alternately simultaneously fold outwardly in a direction toward the front side 22 of the center frame 20 from the neutral position. Each flap 60 is formed of a transparent pliable material. The door frame 55 has a diameter configured to allow passage of the domestic cat therethrough. The diameter is in a range of 6 inches to 8 inches.

Figure 3:
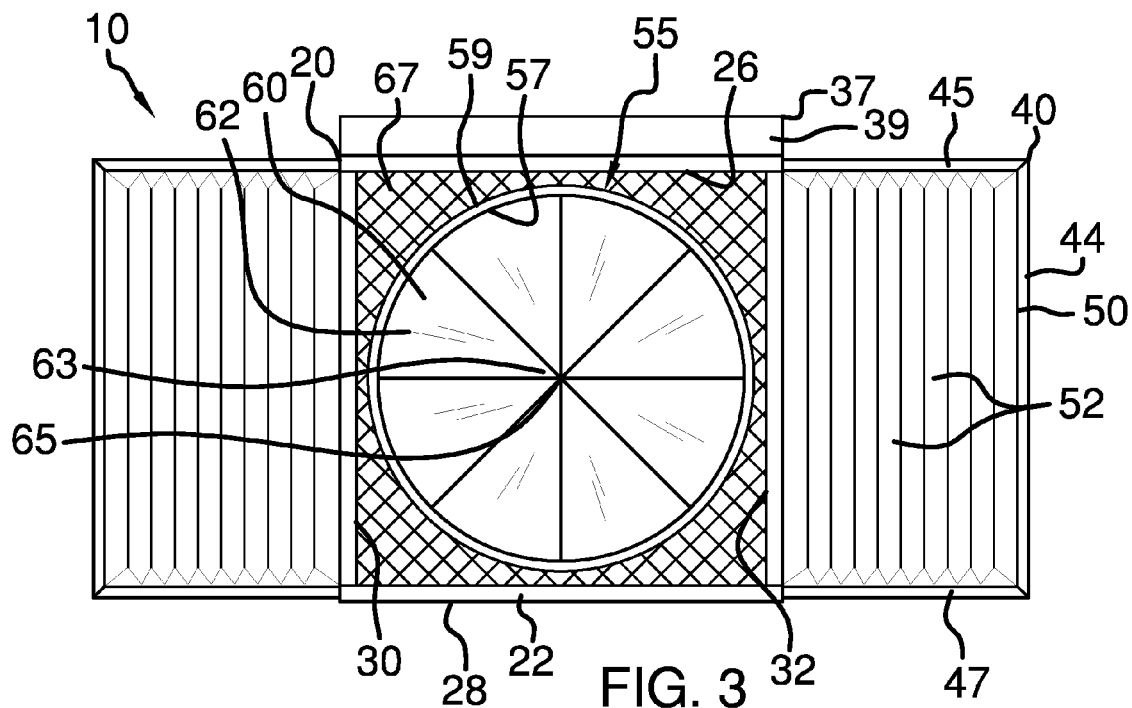
FIG. 3 is a front elevation view.
Figure 4:
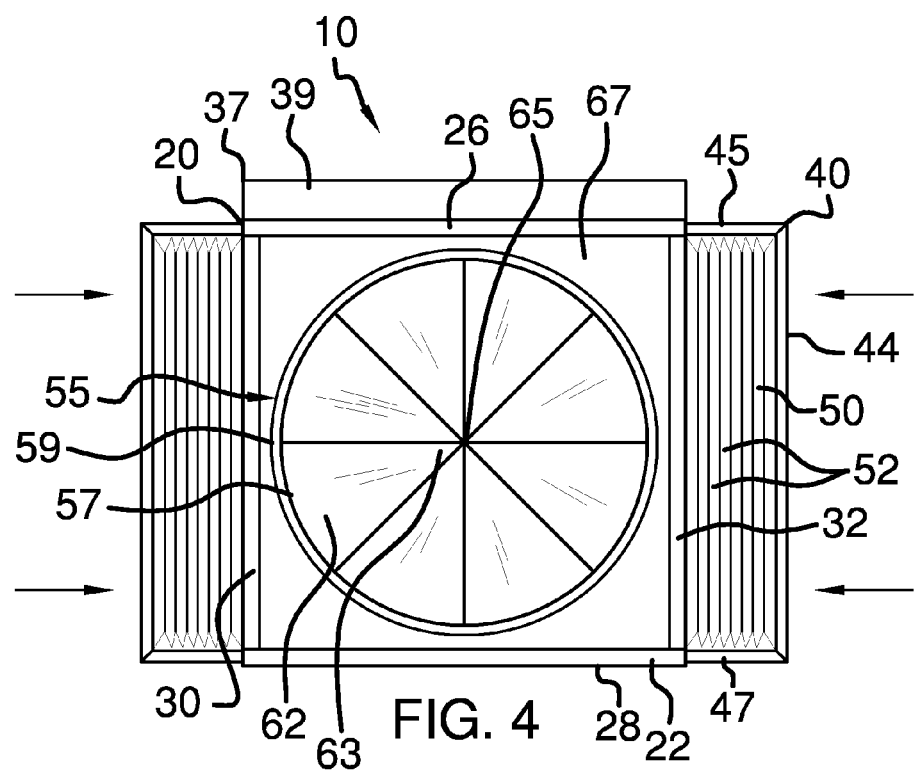
FIG. 4 is a detail view.
Figure 5:
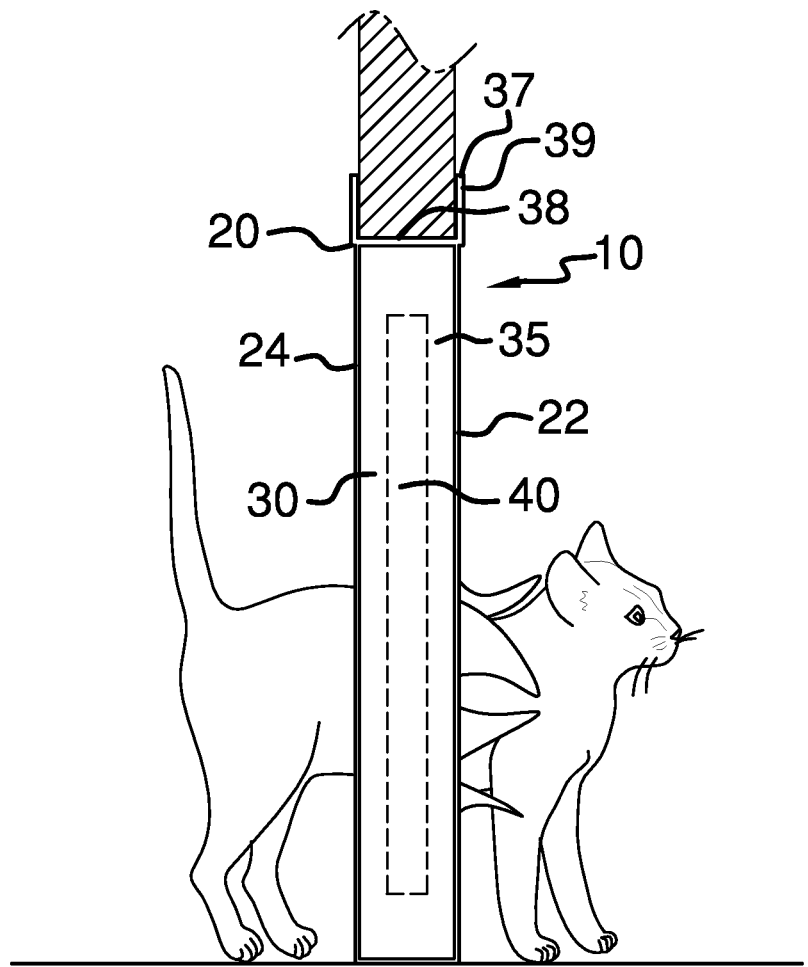
FIG. 5 is an in-use side elevation view.

A gasket 67 is continuously disposed between the outer perimeter 59 of the door frame 55 and the top side 26, the bottom side 28, the left side 30, and the right side 32 of the center frame 20. The gasket 67 is formed of a mesh screen as shown in FIG. 3 and alternately a solid wall as shown in FIG. 1. The mesh screen permits airflow through the gasket 67, while the solid wall prevents airflow through the gasket 67. The gasket 67, the flaps 60, and the side panels 40 prevent wild animals and insects from entering a structure through the device 10.

The bracket 37 is configured to removably receive a lower wall of a slider window, which slides either vertically or horizontally, disposed within a window frame upon placement of the window in a raised and alternately in a partially raised position. Each of the side panels 40 is configured to removably slidingly engage a bottom railing and a respective one of a right railing and a left railing of the window frame. Thus, the present device 10 is installable into a window without the use of tools and without altering a window or a door as is required by many pet doors. Each of the flaps 60, the barrier walls 50, and the gasket 67, when in the form of the solid wall such as Plexiglass® or glass, is water-resistant and alternately waterproof to prevent corrosion and to prevent dust and precipitation in the form of rain, snow, sleet and hail from entering into the structure therethrough. Each of the center frame 20, the u-shaped bracket 37, the outer trim 42 of each side panel 40, and the door frame 55 is corrosion-resistant and alternately corrosion-proof for durability upon exposure to precipitation by being formed of powder coated aluminum, a corrosion resistant alloy, or heavy-duty plastic, for example. Each of the center frame 20, the u-shaped bracket 37, the outer trim 42 of each side panel 40, and the door frame 55 is also formed of crack-resistant materials, such as the power coated aluminum, corrosion resistant alloy, or heavy-duty plastic mentioned hereinabove, for durability upon exposure to extreme temperatures and sunlight. The center frame 20 and the side panels 40 have a combined maximum width in a range of 24 inches to 36 inches. The center frame 20 has a height in a range of 12 inches to 18 inches. The foregoing dimensions permit the device 10 to be installed in a majority of conventional slider windows and permit a domestic cat to pass therethrough.

What is claimed is:

1. A window insertable pet door comprising:
   a substantially planar center frame having a front side, a rear side, a top side, a bottom side, an open left side, an open right side;
   a chamber continuously disposed between the front and rear sides, the top and bottom sides, and the right and left sides;
   a U-shaped bracket having a central bottom end continuously disposed only on the center frame top side and a pair of side walls extending vertically from the central bottom end;
   a pair of adjustable side panels slidingly extendible from the chamber, one of the side panels extending away from each of right side and the left side of the center frame;
   a door frame centrally disposed through the center frame, the door frame having an inner perimeter and an outer perimeter;
   a plurality of triangular flaps radially disposed within the door frame, each flap having an outer edge attached to the inner perimeter and an inner edge centrally disposed with respect to the inner perimeter, the inner edges of the flaps converging at a center point of the door frame, wherein the flaps are configured to simultaneously fold inwardly in a direction toward the rear side of the center frame from a neutral position in a same plane as the inner perimeter and alternately simultaneously fold outwardly in a direction toward the front side of the center frame from the neutral position; and
   a gasket is continuously disposed between the outer perimeter of the door frame and the top side, the bottom side, the left side, and the right side of the center frame;
   wherein the bracket is configured to removably receive a lower wall of a slider window disposed within a window frame upon placement of the window in a raised and alternately in a partially raised position; and wherein each of the side panels is configured to removably slidingly engage a bottom railing and a respective one of a right railing and a left railing of the window frame.

2. The window insertable pet door of claim 1 further comprising:
an outer trim continuously disposed on each of the side panels, the outer trim having at least one outer end parallel to the respective right and left sides of the center frame, a top end, and a bottom end, each of the top end and the bottom end being perpendicular to the outer end; and
a static barrier wall continuously disposed between the outer end, the top end, and the bottom end of the outer trim of each of the side panels.

3. The window insertable pet door of claim 1 wherein the gasket is formed of a mesh screen.

4. The window insertable pet door of claim 1 wherein the gasket is formed of a solid wall.

5. The window insertable pet door of claim 1 wherein each flap is formed of a transparent pliable material.

6. The window insertable pet door of claim 2 wherein each barrier wall comprises a plurality of vertical popoid pleats.

7. The window insertable pet door of claim 6 wherein each of the flaps, the barrier walls, and the gasket is water-resistant and alternately waterproof.

8. A window insertable pet door comprising:
a substantially planar center frame having a front side, a rear side, a top side, a bottom side, an open left side, an open right side;
a chamber continuously disposed between the front and rear sides, the top and bottom sides, and the right and left sides;
a U-shaped bracket having a central bottom end continuously disposed only on the center frame top side and a pair of side walls extending vertically from the central bottom end;
a pair of adjustable side panels slidingly extendible from the chamber, one of the side panels extending away from each of right side and the left side of the center frame;
an outer trim continuously disposed on each of the side panels, the outer trim having at least one outer end parallel to the respective right and left sides of the center frame, a top end, and a bottom end, each of the top end and the bottom end being perpendicular to the outer end; and
a static barrier wall continuously disposed between the outer end, the top end, and the bottom end of the outer trim of each of the side panels, wherein each barrier wall comprises a plurality of vertical popoid pleats;
an annular door frame centrally disposed through the center frame, the door frame having an inner perimeter and an outer perimeter;
a plurality of triangular flaps radially disposed within the door frame, each flap having an outer edge attached to the inner perimeter and an inner edge centrally disposed with respect to the inner perimeter, the inner edges of the flaps converging at a center point of the door frame, wherein the flaps are configured to simultaneously fold inwardly in a direction toward the rear side of the center frame from a neutral position in a same plane as the inner perimeter and alternately simultaneously fold outwardly in a direction toward the front side of the center frame from the neutral position, wherein each flap is formed of a transparent pliable material;
a gasket is continuously disposed between the outer perimeter of the door frame and the top side, the bottom side, the left side, and the right side of the center frame;
wherein the bracket is configured to removably receive a lower wall of a slider window disposed within a window frame upon placement of the window in a raised and alternately in a partially raised position;
wherein each of the side panels is configured to removably slidingly engage a bottom railing and a respective one of a right railing and a left railing of the window frame;
wherein each of the flaps, the barrier walls, and the gasket is water-resistant and alternately waterproof; and
wherein each of the center frame, the u-shaped bracket, the outer trim of each side panel, and the door frame is formed of at least one crack-resistant material and is further corrosion-resistant and alternately corrosion-proof.

9. The window insertable pet door of claim 8 wherein the door frame has a diameter configured to allow passage of a domestic cat therethrough.

10. The window insertable pet door of claim 9 wherein the diameter is in a range of 6 inches to 8 inches.

11. The window insertable pet door of claim 9 wherein the gasket is formed of a mesh screen.

12. The window insertable pet door of claim 9 wherein the gasket is formed of a solid wall.

13. The window insertable pet door of claim 10 wherein the gasket is formed of a mesh screen.

14. The window insertable pet door of claim 11 wherein the gasket is formed of a solid wall.

* * * * *